United States Patent
Fowler et al.

(10) Patent No.: US 6,538,408 B2
(45) Date of Patent: Mar. 25, 2003

(54) CONTROLS TO INCORPORATE THREE-PHASE MOTORS INTO VEHICLES

(75) Inventors: Craig Rae Fowler, Caen (FR); Dennis A. Kramer, Troy, MI (US); Jerome Quere, Bieville-Beuville (FR); Enrico Fin, Lake Orion, MI (US); George Chene, Sterling Heights, MI (US); Stephen Chiu, Thousand Oaks, CA (US); Pascal Garrido, Kilworthy (CA); Ira B. Goldberg, Thousand Oaks, CA (US); Charles Hopson, Lebanon, TN (US); David M. Barry, Stratford Upon Avon (GB); Dan Rogovin, Newbury Park, CA (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/836,898

(22) Filed: Apr. 17, 2001

(65) Prior Publication Data

US 2002/0149339 A1 Oct. 17, 2002

(51) Int. Cl.$^7$ .................................................. H02P 7/68
(52) U.S. Cl. .......................... 318/498; 318/85; 318/105
(58) Field of Search .............................. 318/34, 49, 51, 318/112, 727, 730, 139, 53, 85, 105, 494, 498

(56) References Cited

U.S. PATENT DOCUMENTS

| | | | |
|---|---|---|---|
| 3,947,736 A | * 3/1976 | Byers | |
| 3,970,942 A | * 7/1976 | Mayer | |
| 4,093,905 A | * 6/1978 | von Braun | 318/138 |
| 4,117,364 A | * 9/1978 | Baker | 363/43 X |
| 4,221,001 A | * 9/1980 | Heeren | |
| 4,335,337 A | * 6/1982 | Okamatsu et al. | 318/52 |
| 5,355,061 A | * 10/1994 | Forhan | 318/443 |
| 5,373,206 A | * 12/1994 | Lim | 318/138 X |
| 5,428,273 A | * 6/1995 | Doring | 318/138 |
| 5,629,567 A | * 5/1997 | Kumar | 290/3 |
| 5,903,115 A | * 5/1999 | Taylor | 318/34 |
| 6,008,616 A | * 12/1999 | Nagayama et al. | 318/773 |

* cited by examiner

Primary Examiner—Bentsu Ro
(74) Attorney, Agent, or Firm—Carlson, Gaskey & Olds

(57) ABSTRACT

A plurality of motors for use in driving accessories on a vehicle, are each powered by three-phase current. A single controller controls the supply three-phase current to the plurality of motors. In another aspect of the invention, pseudothree-phase current is created from a direct current voltage source. A chopping circuit chops the voltage into a plurality of pulses, and a phase shift circuit then creates phase-shifted power signals from those pulses. The present invention thus enables the use of three-phase alternating current motors on a vehicle to drive accessories. This reduces the cost and size of the required motors.

23 Claims, 2 Drawing Sheets

… (US 6,538,408 B2)

CONTROLS TO INCORPORATE THREE-PHASE MOTORS INTO VEHICLES

BACKGROUND OF THE INVENTION

This invention relates to a method of incorporating three-phase motors and associated controls into a vehicle.

Vehicles have been historically equipped with a 12-volt power supply providing direct current. Vehicles have more and more electrical components, and are typically equipped with several motors for powering various accessories. As an example, the windows, the locks, the seats, moon roofs/sun roofs, etc., are all powered by separate motors. Historically, these motors have utilized direct current. In the near future, it is expected that the power supply on vehicles will be increased to 42 volts direct current.

There are motors which are less expensive and smaller than the typical direct current motor. One type of inexpensive and small motor is powered by three-phase alternating current. However, the use of three-phase motors has not been practical in the vehicle environment, since a three-phase power supply has not been practically available in the vehicle. Moreover, three-phase motors typically require associated controls, that would be relatively expensive. Thus, although there would be benefits to utilizing three-phase motors in the vehicle environment, this has not been practically realized.

SUMMARY OF THE INVENTION

In a disclosed embodiment of this invention, the use of three-phase motors is made more practical in the vehicle environment. In one feature of this invention, a single controller is utilized to control the supply of three-phase power to a number of three-phase motors. Essentially, a single controller, which may be the central controller for the entire vehicle, is operable to control switching elements associated with each of the motors. The controller controls the switching element to enable or prevent the flow of three-phase power to the individual motors.

In another aspect of this invention, pseudothree-phase power is supplied from a DC source. The DC current is associated with a "chopping" element that chops the direct current into a series of pulses. The pulses are sent to a power shift register which translates the pulses into power pulses, and shifts the phase among sequential pulses to provide pseudothree-phase power to a motor.

This aspect can be combined with a common controller such that three-phase power is supplied to a plurality of motors, and a single controller is operable to achieve the flow of the current to the individual motors. In further aspects of this invention, the shift circuit can output unipolar or di-polar signals.

Further, the power converter to convert the voltage signals into power may be separate from the shift register.

These and other features of the present invention can be best understood from the following specification and drawings, the following of which is a brief description.

DETAILED DESCRIPTION OF A PREFERRED EMBODIMENT

Figure 1:
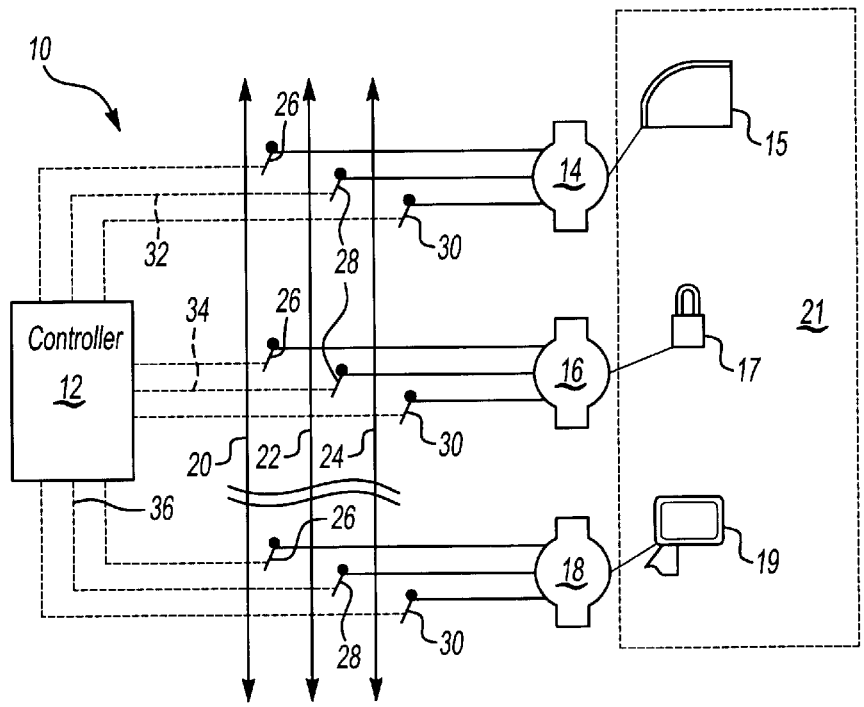
FIG. 1 is a schematic view of a controller for a vehicle.

FIG. 1 shows a circuit 10 having a single controller 12 controlling the flow of current to a plurality of three-phase motors 14, 16 and 18. Motors 14, 16 and 18 can be associated with a window 15, a door lock 17 and a mirror 19, shown schematically, in a door module 21. The door module is mounted within a vehicle. This only shows suggested applications, and the present invention would extend to a circuit for powering motors at many locations on a vehicle.

Three power lines 20, 22 and 24 supply the three-phase power. A plurality of switches 26, 28 and 30 are associated with each power line 20, 22 and 24, and selectively supply the power to the individual motors 14, 16 and 18. Controller 12 is operable to send appropriate control signals through lines 32, 34 and 36 to operate the switches 26, 28 and 30 and to supply power to a selected motor 14, 16 or 18. It should be understood that more than three motors could be associated with this circuit, and it should be understood that the switches 26, 28 and 30 may be as known in the art. The switches can be individually actuated, with three separate control lines. A single switch element may be controlled by a single control line to achieve the connection of all three power lines. This aspect of the invention thus simplifies the control circuitry for supplying three-phase power to a number of three-phase powered motors. A single controller may be utilized, and the controller may be the main control element for the entire vehicle.

Figure 2:
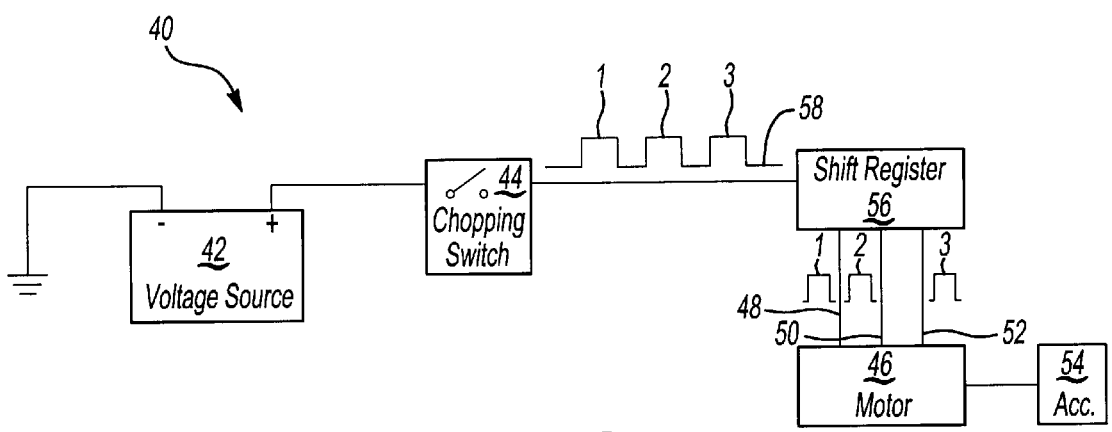
FIG. 2 is a schematic view of a current generating circuit.

The three-phase power supplied to the motors on a vehicle may be generated by a circuit such as circuit 40 as shown in FIG. 2. As shown, a voltage source 42, which may be a 42 volt power source, or could be a lower voltage power source, supplies voltage to a chopping switch 44. The output of this chopping switch 44 is a series of pulses 58. A mosfet or other electronic switch can be used as switch 44. As shown, each three chopped signals 58 move to a power and shift register 56. The power and shift register 56 separates the signals 1, 2 and 3 into phase-shifted current pulses directed through lines 48, 50 and 52 to a motor 46. The motor 46 is shown schematically driving an accessory 54 on a vehicle. The circuit 56 would be made of known elements capable of turning the pulses 58 into phase-shifted power pulses for the individual lines 48, 50 and 52. Flip flops, and other appropriate circuit elements would be preferably utilized for the circuit element 56.

Figure 3:
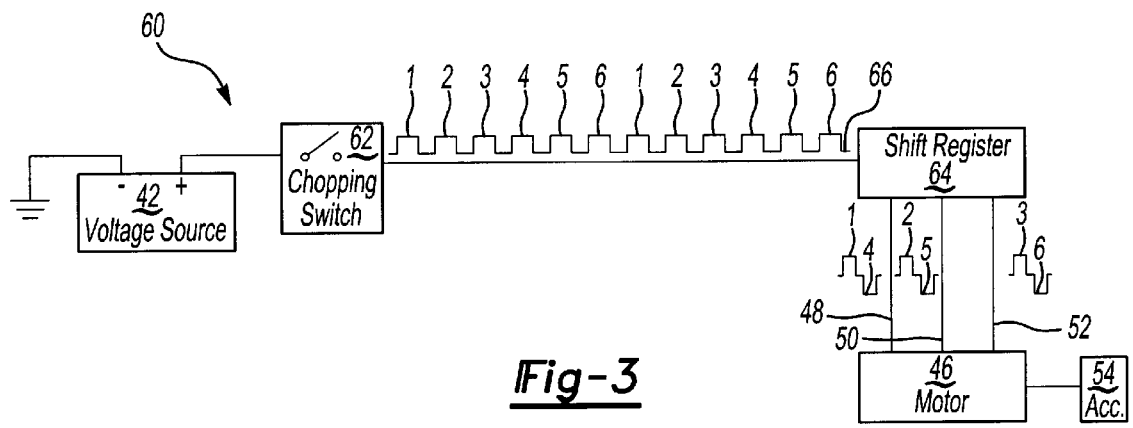
FIG. 3 is a view of a second embodiment current generating circuit.

FIG. 3 shows another embodiment 60 wherein the chopping circuit 62 creates a signal 66 having pulse separated into groups of six. The wavelets reach a power and shift circuit 64 which alternately reverses the polarity of the output power signals through the lines 48, 50 and 52 as shown in figure. Now signals 1 and 4, 2 and 5 and 3 and 6 are di-polar power pulses delivered to power lines 48, 50 and 52.

The circuits shown in FIGS. 2 and 3 take DC voltage, and create three-phase alternating current. Only simple circuit elements are required, and thus the present invention supplies three-phase current with a relatively inexpensive control package. Thus, the use of the three-phase motors becomes practical with this instant invention.

Figure 4:
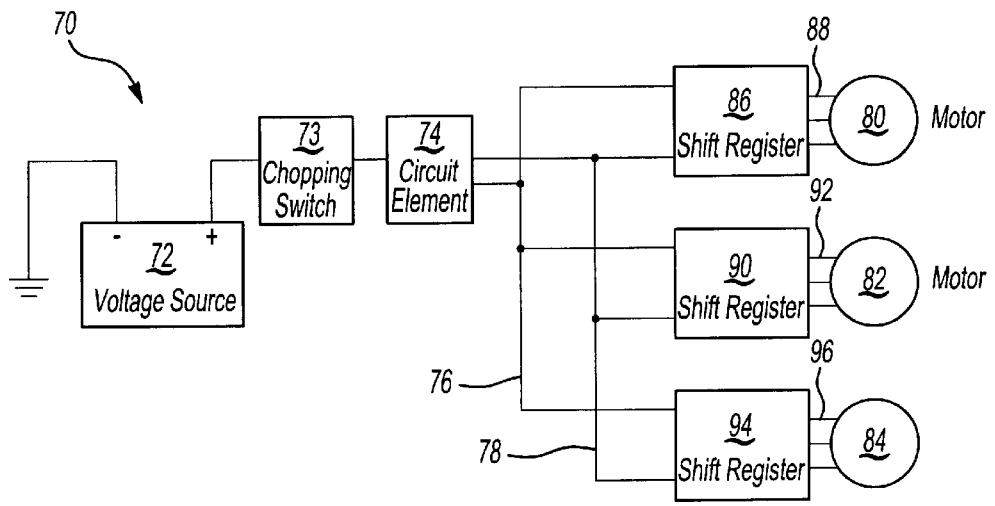
FIG. 4 is a view of another embodiment.

FIG. 4 shows another circuit 70 and voltage source 72 wherein the power conversion is performed by a chopping switch 73 and circuit element 74 associated with two power lines 76 and 78. Thus, the signals reaching the shift registers 86, 90 and 94 are already converted into power pulses. The shift registers 86, 90 and 94 convert the signals into the phase-shifted currents for the three-phase wires 88 associated with motors 80, 82, 84. This invention does not require the power shift to be associated with each motor. Moreover, a circuit such as the circuit shown in FIG. 2 or 3 could be associated to supply the power for the lines 20, 22 and 24 in the FIG. 1 embodiment.

The present invention thus reduces the expense and complexity of supplying three-phase power, and controlling that power to flow to appropriate ones of a plurality of motors on a vehicle.

Although preferred embodiments have been disclosed, a worker in this art would recognize that certain modifications would come within the scope of this invention. For that reason, the following claims should be studied to determine the true scope and content of this invention.

What is claimed is:

1. A power system for driving an accessory on a vehicle comprising:
    a motor powered by three-phase current;
    a direct current voltage source; and
    a shift circuit for changing said direct current into three-phase current to said motor wherein said direct current voltage source is connected to a chopping circuit which creates a series of pulses, said pulses being sent to a phase shift register which shifts the phases of sequential ones of said pulses to provide said three-phase power to said motor.

2. A power system for driving an accessory on a vehicle comprising:
    a motor powered by three-phase current;
    a direct current voltage source; and
    a shift circuit for changing said direct current into three-phase current to said motor wherein said circuit for converts chopped pulses into three-phase power and incorporates a separate power element for supplying power signals to a plurality of said motors, and a phase shift element associated with each of said plurality of motors.

3. A system as recited in claim 2, wherein each of said motors power an accessory on a vehicle.

4. An electrical motor system for use on a vehicle comprising:
    at least one three-phase powered motor;
    a power supply for supplying three-phase power to three inputs for said motor;
    a chopping switch receiving power from said power supply to create a series of pulses; and
    at least one phase shift register for receiving and separating said pulses into phase shifted current pulses directed through said inputs to said motor.

5. A system as recited in claim 4 wherein said motor powers an accessory on a vehicle.

6. A system as recited in claim 4 wherein said power supply includes a direct current voltage source.

7. A system as recited in claim 6 wherein said series of pulses comprises three chopped signals and wherein said phase shift register separates said three chopped signals into three phase shifted current pulses with one of said phase shifted current pulses being associated with one of said inputs.

8. A system as recited in claim 7 wherein said at least one motor comprises a plurality of motors said three phase shifted current pulses selectively power all of said motors with three-phase power via a system of switches.

9. A system as recited in claim 6 wherein said shift register creates a di-polar output signal for said inputs.

10. A system as recited in claim 9 wherein said series of pulses are separated into groups of six comprising a first signal, a second signal, a third signal, a fourth signal, a fifth signal, and a sixth signal and wherein said phase shift register alternately reverses polarity such that said first and fourth signals are a di-polar power pulse delivered to a first of said three inputs, said second and fifth signals are a di-polar power pulse delivered to a second of said three inputs, and said third and sixth signals are a di-polar power pulse delivered to a third of said three inputs.

11. A system as recited in claim 10 wherein said at least one motor comprises a plurality of motors and wherein said first, second, and third di-polar power pulses selectively power all of said motors with three-phase power via a system of switches.

12. A system as recited in claim 4 including a circuit element associated with a pair of power lines that direct power to said shift register wherein said circuit element receives said series of pulses from said chopping switch.

13. A system as recited in claim 12 wherein said at least on motor comprises a plurality of motors and said at least one phase shift register comprises a plurality of phase shift registers with one of said phase shift registers being associated with only one of said motors.

14. A system as recited in claim 13 wherein said chopping switch comprises a single chopping switch element and wherein said pair of power lines comprises a first power line operably connecting said circuit element to each of said phase shift registers and a second power line separately connecting said circuit element to each of said phase shift registers such that said single chopping switch element and said circuit element provide said series of pulses for receipt by said plurality of phase shift registers.

15. A system as recited in claim 14 wherein each of said motors includes three inputs associated with three outputs from a single phase shift register with each of said phase shift registers converting said series of pulses into phase shifted currents for said three inputs.

16. A system as recited in claim 4 wherein said at least one motor comprises a plurality of motors with each motor powering a different vehicle accessory and wherein each of said motors includes three inputs for three-phase power.

17. A system as recited in claim 16 wherein said power supply includes three power lines for supplying three-phase power.

18. A system as recited in claim 17 including a switching system having a plurality of switches associated with each of said power lines to selectively supply power to said motors.

19. A system as recited in claim 18 including a single controller that controls all of said switches.

20. A system as recited in claim 19 wherein said plurality of switches comprises a first set of switches selectively connecting a first of said three power lines to each of a first of said three inputs, a second set of switches selectively connecting a second of said three power lines to each of a second of said three inputs, and a third set of switches selectively connecting a third of said three power lines to each of a third of said three inputs.

21. A system as recited in claim 18 wherein each of said motors is operably associated with a door module.

22. A system as recited in claim 21 wherein said vehicle accessories include at least a power door lock and a power window.

23. A system as recited in claim 4 wherein said power supply comprises a 42-volt power source.

* * * * *

UNITED STATES PATENT AND TRADEMARK OFFICE
CERTIFICATE OF CORRECTION

PATENT NO.   : 6,538,408 B2
DATED        : March 25, 2003
INVENTOR(S)  : Fowler et al.

It is certified that error appears in the above-identified patent and that said Letters Patent is hereby corrected as shown below:

Column 4,
Line 21, "on" should be -- one --.

Signed and Sealed this

Tenth Day of June, 2003

JAMES E. ROGAN
*Director of the United States Patent and Trademark Office*